Patented June 4, 1935

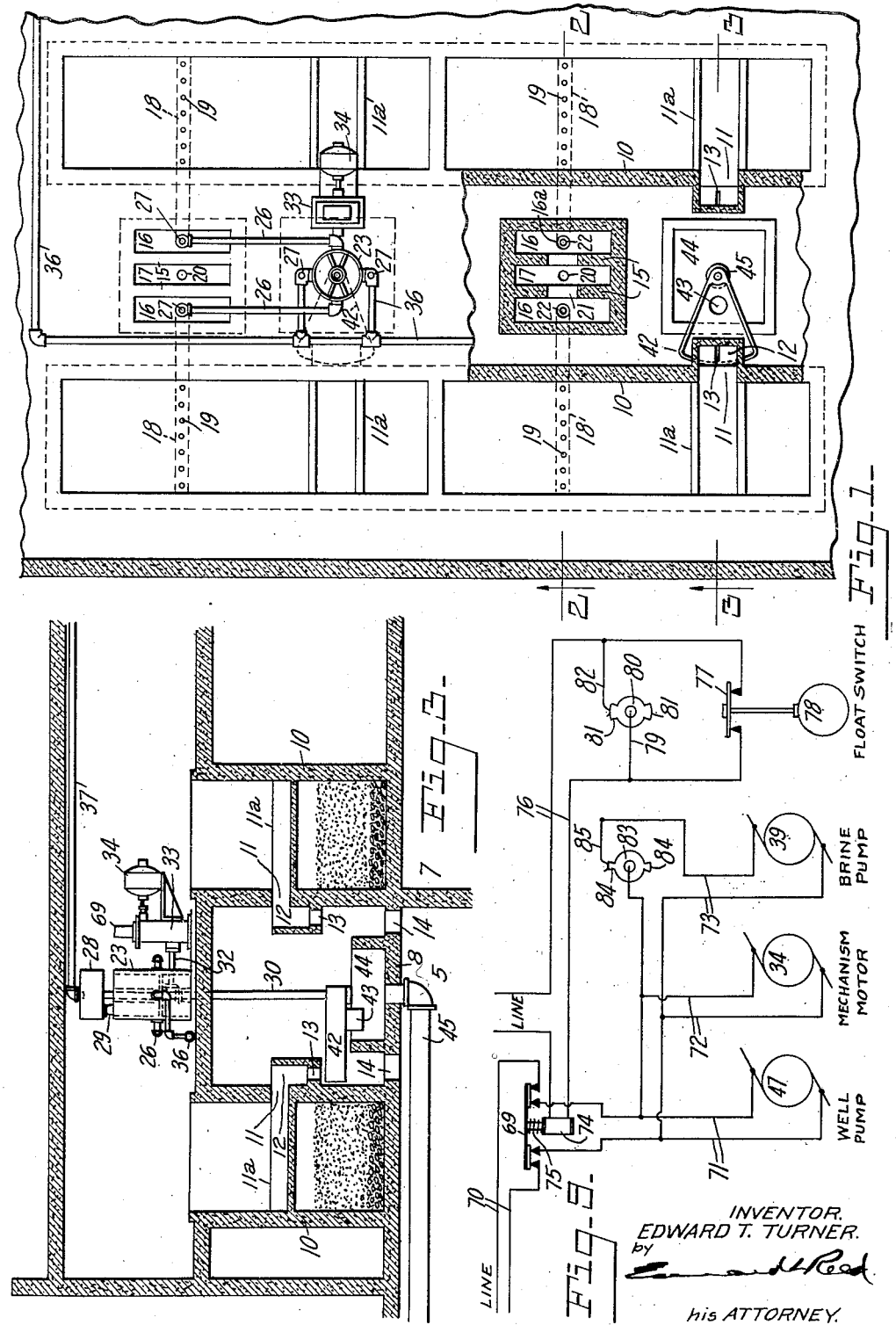

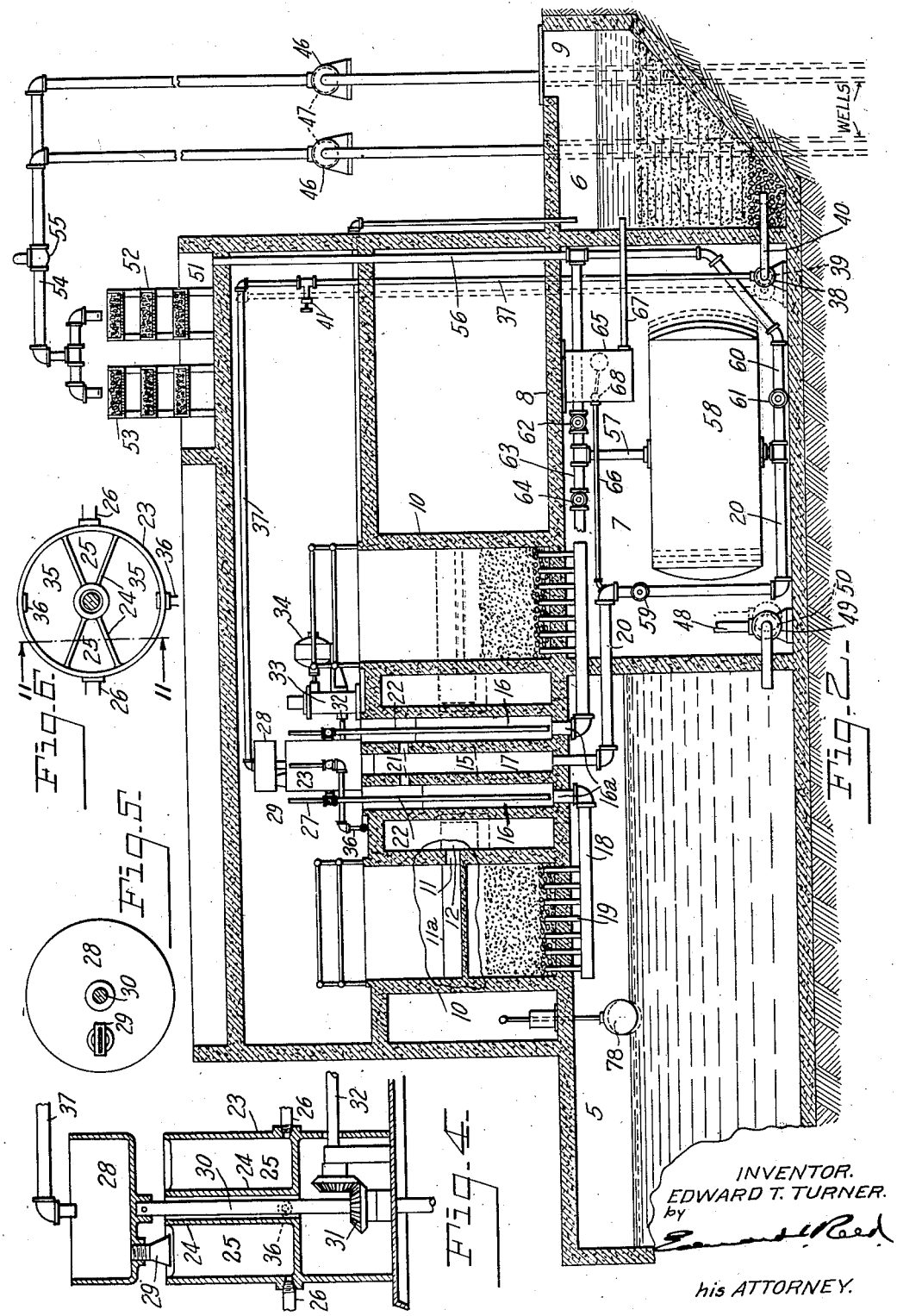

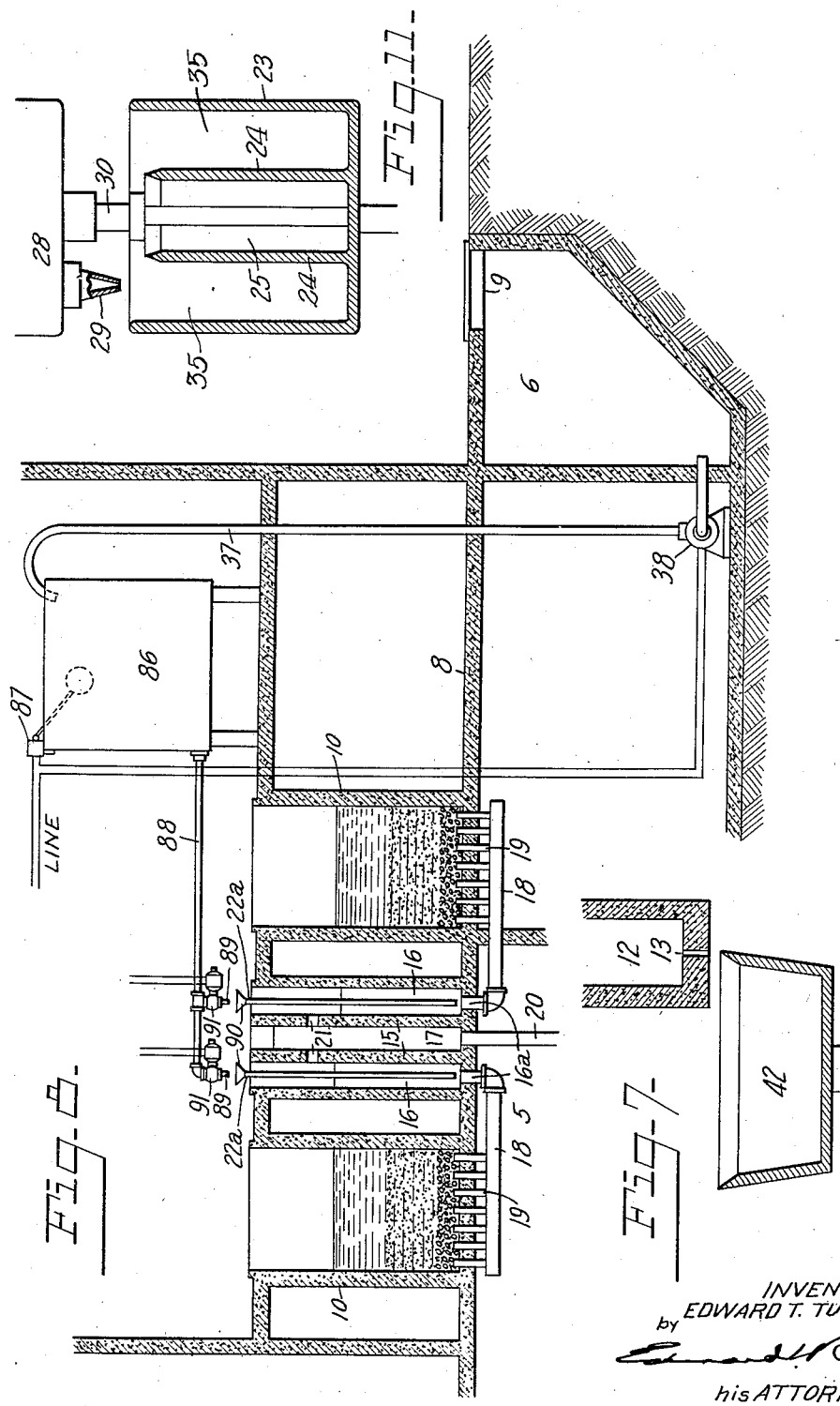

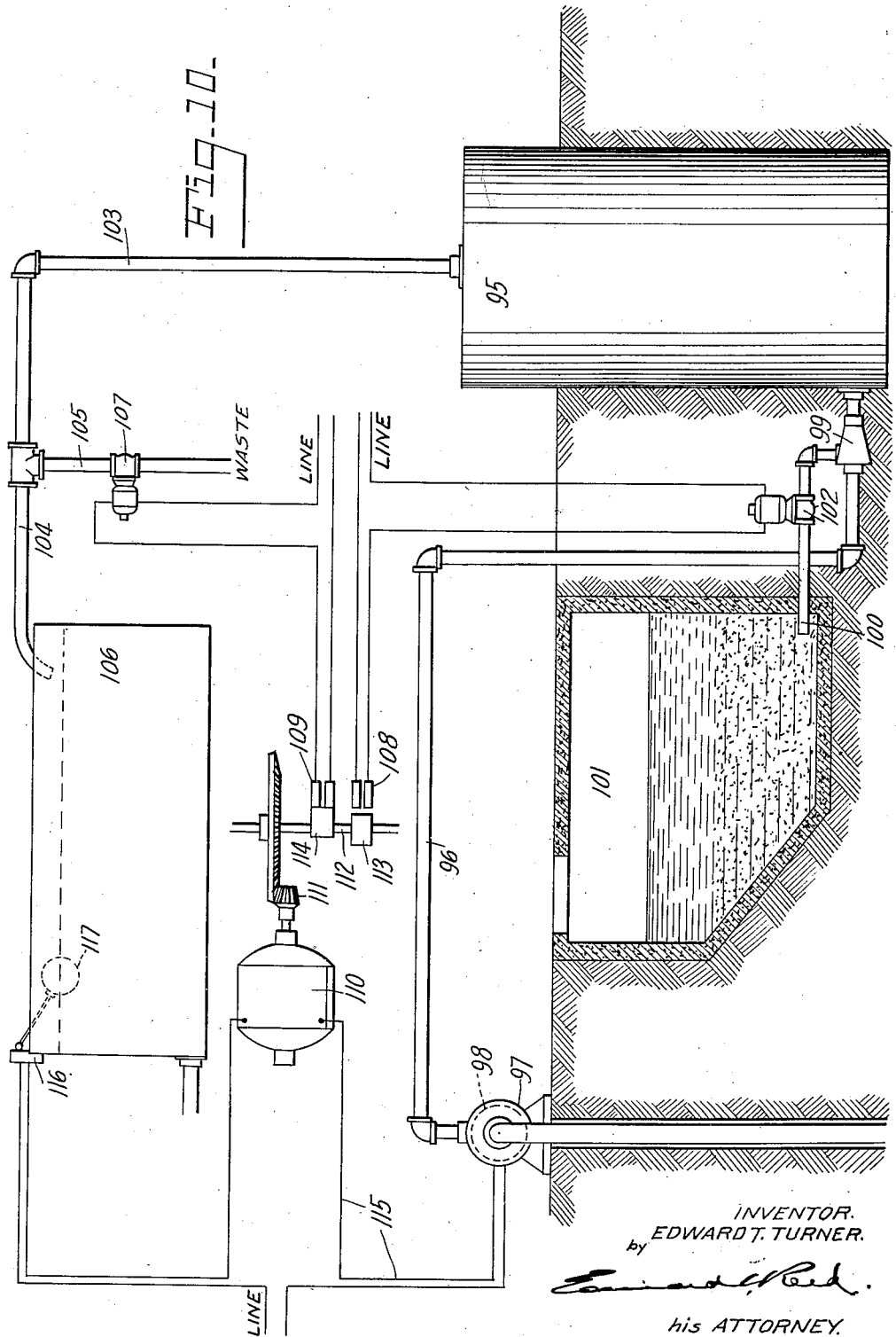

2,003,762

UNITED STATES PATENT OFFICE 2,003,762

WATER TREATING APPARATUS

Edward T. Turner, Dayton, Ohio, assignor to The Permutit Company, 1934), Wilmington, Del., a corporation of Delaware Application October 9, 1931, Serial No. 567,913

30 Claims. (Cl. 210—24)

This invention relates to an apparatus for treating water for the purpose of softening the same and of removing foreign matter therefrom.

One object of the invention is to provide such an apparatus of large capacity, such as is required for municipal plants and the like, which will be simple in its operation and which may be operated at a relatively low cost.

A further object of the invention is to provide such an apparatus which comprises one or more mineral containers, with improved means for delivering water to the mineral containers; and means for controlling the pressure at which the water is introduced into said containers.

A further object of the invention is to provide improved means for automatically controlling the reconditioning of the mineral.

A further object of the invention is to provide such an apparatus in which the supply of water to the apparatus and the reconditioning mechanism will be electrically controlled and the electric controlling means will in turn be controlled according to the amount of soft water used.

Other objects of the invention will appear as the apparatus is described in detail.

In the accompanying drawings Fig. 1 is a plan view, partly in section, of a portion of an apparatus embodying my invention and comprising two double softening units; Fig. 2 is a transverse section taken through such an apparatus on line 2—2 of Fig. 1; Fig. 3 is a transverse section taken through such an apparatus on line 3—3 of Fig. 1, and partly broken away; Fig. 4 is a vertical sectional view of the brine distributor; Fig. 5 is a bottom plan view of the delivery basin forming part of the brine distributor; Fig. 6 is a plan view of the brine distributor receptacle; Fig. 7 is a transverse sectional view taken through the drain trough; Fig. 8 is a transverse sectional view of a portion of the apparatus showing a modified form of brine distributing mechanism; Fig. 9 is a diagram of the electrical circuits; Fig. 10 is a diagrammatic illustration of a modified installation, and Fig. 11 is a vertical section through the brine distributor taken on the line 11—11 of Fig. 6.

In these drawings I have illustrated certain embodiments of my invention and, in the preferred embodiment, have shown the same as designed for a particular municipal installation but it will be understood that the apparatus may take various forms and that the organization and arrangement of the mechanism may vary in different installations.

In the installation here shown the apparatus comprises a main structure of concrete which is partially embedded in the earth so that certain of the reservoirs and other parts of the apparatus are below the ground. This is a convenient arrangement but is not essential to the invention. The lower portion of the apparatus is divided into three compartments, a compartment 5 constituting a soft water reservoir, a compartment 6 constituting a salt reservoir or brine tank, and a compartment 7 constituting the mechanism chamber in which certain pumps, filters and so forth are arranged. The top wall 8 of these several compartments is, in the present instance, at substantially the ground level and is provided with an opening 9 above the brine tank to permit the delivery of salt thereto. The top wall 8 of the lower compartments constitutes the floor of the upper compartment. Mounted on this floor are the water softening unit or units and the reconditioning mechanism. The apparatus may comprise one or any desired number of softening units and each softening unit may consist of one or a plurality of softeners. Each softening unit is preferably controlled independently of the other softening units so that a single unit or any desired number of units may operate at a given time. In the arrangement shown in Fig. 1 the apparatus comprises two double softening units, each unit consisting of two containers 10 for water softening material, such as zeolite, green sand or the like, and herein referred to as the mineral. The two containers are spaced some distance apart and each is provided at a point above the level of the mineral therein with an outlet for the softened water. This outlet may be in the form of an opening 11 formed in the wall of the container and preferably this opening communicates with a trough 12 on the outer side of the wall which has in its bottom an opening 13 through which the fluid may be discharged. This opening is, in the present instance, arranged above an opening 14 in the floor 8 above the soft water reservoir 5 so that the soft water falls from the trough 12 through the opening 14 into the reservoir and is thus aerated and oxidized before delivery to the reservoir. I prefer to provide each container with a collecting trough 11a which extends across the container above the mineral and communicates with the outlet 11. The water flows over the edges of this trough throughout the width of the container and thus prevents channeling of the mineral which might result if the water flowed directly to the relatively small outlet.

The hard water which is to be softened may be delivered to the containers in any suitable manner but I prefer to employ the arrangement here shown, in which I have arranged between the two containers of each unit a structure, in the present instance of concrete, which is divided by partitions 15 into three compartments, the outer compartments 16 constituting supply reservoirs for the respective containers, and the third compartment 17, which is arranged between the compartments 16, constituting a delivery reservoir which delivers the water to the supply reservoirs. Each supply reservoir 16 has at the lower end thereof, and preferably in the floor 8, an outlet opening 16a and a pipe 18 receives the water from this outlet and delivers it to the container, the pipe being here shown as arranged beneath the floor 8 and provided with a plurality of distributing tubes 19 which extend through the floor into the lower portion of the container. This arrangement is such that normally, that is when the apparatus is not in operation, the water will be maintained at substantially the same level in each container and its supply reservoir, but when the apparatus is in operation the water will rise in the supply reservoirs above the level of the water in the containers. The delivery reservoir 17 may be supplied with water in any suitable manner and, as here shown, a supply pipe 20 extends through the bottom wall 8 into the reservoir 17 and may be connected, either directly or indirectly, with a pump or other source of water supply. The delivery reservoir communicates with the two supply reservoirs at points above the normal level of the water in the supply reservoir, and, in the present instance, it is provided with outlet openings 21 arranged above the level of the outlet openings 11 of the corresponding containers. Preferably the outlet openings 21 are on the same level. Thus the water which is delivered from the reservoir 17 to the supply reservoirs 16 will fall from the openings 21 to the level of the water in the supply reservoirs and will thus be aerated and all air and gas contained therein released. Also any oil in the water will rise to the surface in the supply reservoirs and will not be delivered to the containers. Further, this method of supplying water to the containers avoids the delivering of the water at such pressure as to disturb the mineral beds and possibly float part of the mineral out through the discharge openings. When no water is being softened the water in each container and its supply reservoir will be at substantially the same level and when water is delivered to the supply reservoir the level in the reservoir will rise and the pressure in the container will be gradually increased and the level of the water therein raised so that it will flow over the edges of the collecting trough 11a, but this is accomplished slowly and without any sudden inrush of water or any high pressure which would disturb the mineral bed. Further, this method of delivering water to the containers causes the same quantity of water to be softened in each container even though the resistance to the flow through one container may be greater than the resistance to the flow through the other container, because of a tighter packing of the mineral or for other reasons. If the resistance to the flow through one container is greater than through the other container the water in the supply reservoir for that container will rise to a higher level than it rises in the other supply reservoir and the increased head will exert a greater pressure within the container and will force the water through the mineral, at the same rate of flow as in the other container, and when the delivery of water to the two supply reservoirs has been interrupted the water will stand above the normal level in the one reservoir and will continue to flow to the corresponding container until it reaches normal level. Thus at the end of the softening operation the same amount of water has been softened by both containers and consequently the timing of the reconditioning mechanism will be the same for both containers. It will be obvious that the supply reservoir may be arranged at any suitable height with relation to the container but it is desirable that the bottoms of the reservoirs shall not be above the level of the outlets for the containers, as this would result in trapping air in the conduits which, when discharged into the container, would agitate the mineral and cause portions of it to flow out with the water. If the bottoms of the reservoirs are at the level of the outlets the water will be entirely discharged from the reservoirs when the apparatus is not in operation but will stand in the conduits at the level of the water in the containers. The delivery reservoir 17 is desirable in a multiple container unit but it is not necessary when a single container is used, as the water may then be delivered to the supply reservoir in any suitable manner.

As is well known, water softening material of the kind here employed becomes exhausted after continued use and must be reconditioned by subjecting the same to the action of a reconditioning solution, such as salt water; the term "brine" is here employed to include any such reconditioning solution. In the present apparatus the brine is delivered to the containers through the respective supply reservoirs and the conduits which connect the same with the containers. For this purpose brine pipes 22 extend into the respective supply reservoirs and have their discharge ends arranged close to and in line with the outlet openings 16a so that the brine will be discharged directly into those openings and will be carried through the supply pipes 18 to the container. The arrangement of the discharge end of the brine pipe with relation to the outlet is such that the brine will not mix with the water in the supply reservoir but will be carried by that water into the pipe 18 and there mixed with the water to provide a salt solution of the proper strength. Because of this arrangement no brine will remain in the supply reservoirs at the end of the reconditioning operation. The brine may be supplied to the brine pipes 22 from any suitable source and any suitable means may be employed for controlling the supply and for timing the delivery of the brine to the containers. As shown in Figs. 2, 3 and 4, the brine distributing apparatus is supported at a level higher than the supply reservoir 16 and is, in the present instance, mounted on the top wall of the structure in which this reservoir is formed. This distributing apparatus comprises a receptacle 23, see Figs. 4 and 6, which is divided by partitions 24 into a plurality of compartments. When used in connection with a double softening unit this receptacle is preferably provided with four compartments two of which, as shown at 25, are relatively small and constitute supply receptacles for the brine. Pipes 26 lead from the lower portions of these brine supply receptacles and are connected with the upper ends of the brine pipes 22 which extend above the reservoirs in which they are mounted, so that the brine will flow by gravity from the receptacles 25 to the respective water supply reservoirs. If desired, the brine pipes may be provided with vent tubes 27. Rotatably mounted above the main receptacle structure 23 is a brine delivery device which, as here shown, comprises a basin 28 having a discharge nozzle 29. This basin may be rotatably supported in any suitable manner, as by mounting it on the upper end of a shaft 30, which extends upwardly through a central passageway in the structure 23. The shaft is connected by gears 31 with a shaft 32 which in turn is connected through suitable reducing gearing, arranged within a casing 33, with an electric motor 34. The speed of the motor is very greatly reduced by the gearing so that the basin 28 rotates slowly and the nozzle moves into and out of line with the brine receptacles 25. When the nozzle is in line with one of the brine receptacles 25 it will deliver brine to that receptacle and the brine will flow through the pipes 26, 22 and 18 to the corresponding container, and the supply of brine to the container will be continued so long as the nozzle is in line with the receptacle 25 but it will be discontinued as soon as the nozzle passes beyond that receptacle. The larger receptacles within the structure 23, which are arranged between the receptacles 25, as shown at 35, are connected by pipes 36 with the brine tank 6 so that any brine which is discharged from the nozzle 29 into the larger receptacles 35 will be returned to the brine tank. It is preferable, however, as will hereinafter appear, to interrupt the delivery of brine by the nozzle when the latter is out of line with both brine receptacles 25. The upper edges of the partitions 24 are preferably depressed slightly below the upper edge of the wall of the structure 23 to prevent splashing (see Fig. 11.) The partitions 24 extend substantially radially to the axis about which the nozzle rotates and have thin upper edges, the edges being preferably beveled inwardly. The discharge opening of the nozzle 29 is elongated radially to the axis about which the nozzle rotates and is relatively narrow so that it will pass quickly across the partitions 24. The arrangement of the partitions and of the nozzle not only causes communication between the nozzle and the receptacles to be quickly established and interrupted but also reduces splashing to a minimum. The brine may be supplied to the nozzle in any suitable manner. When, as in the present instance, the nozzle is carried by a basin I prefer to deliver the brine to the basin through a brine supply pipe 37, which is connected with a pump 38 driven by an electric motor 39 and having a suction pipe 40 leading from the brine tank 6. I also prefer to provide this brine supply pipe with a needle valve 41 by means of which the flow of brine therethrough may be regulated, thus enabling the soft water in the reservoir 5 to be maintained at a selected average hardness, with all the water which is delivered to the soft water receptacle passing through the softener.

In order to prevent the brine which is discharged from the container from entering the soft water reservoir I have mounted in the space between the two containers a drain trough 42 which is movable into line successively with the discharge openings 13 of the outlet troughs 12 and has an outlet 43 arranged to discharge into a drain basin 44 which is connected with a drain pipe 45. Preferably this drain trough 42 is secured to the lower end of the shaft 30 which carries the rotating nozzle of the brine distributing apparatus so that this nozzle and the drain trough are maintained in fixed relation one to the other. This relation is such that the drain trough will be moved into line with the discharge opening for one of the containers at approximately the same time that the nozzle moves into communication with the brine receptacle which is connected with that container. Inasmuch as it requires an appreciable interval for the brine to travel to and through the container the trough may, if desired, be positioned slightly behind the nozzle. The drain trough is of such a width that it will remain in line with the discharge opening of the container after the brine nozzle has passed beyond the brine receptacle. Thus the fresh water which flows through the container after the supply of brine has been cut off will wash out of the container the brine that remains therein and this wash water is also delivered to the drain trough. After an interval sufficient to thoroughly wash the mineral in the container free from salt the drain trough moves beyond the discharge opening and the water from the container is again delivered to the soft water reservoir. In order to prevent the splashing of the brine or wash water out of the drain trough, and thus permitting it to enter the soft water reservoir, the discharge openings 13 of the outlet troughs for the containers are in the form of narrow slots, as shown in Fig. 1, arranged substantially radially to the axis of the rotating trough and the side walls of that trough are so arranged that each will be substantially parallel with the discharge slot as it passes the same. This permits of a very quick passage of the trough into and out of line with the discharge opening. The upper edges of the trough are made thin and are preferably beveled inwardly, as shown in Fig. 7, so as to direct the fluid striking the same into the trough.

The water to be treated is delivered to the apparatus by a pump or pumps 46 operated by motors 47 and the soft water is delivered from the reservoir 5 to the service line 48 by a pump 49 driven by an electric motor 50. The connection between the pipe 20 and the hard water pumps 46 may be direct or it may be through suitable intermediate controlling or treating apparatus. Some waters contain foreign substances such as corrosive gases, iron, sulphur and the like, which it is desirable to remove before introducing the water into the mineral containers. If iron is in solution it may be removed by the mineral but when the iron is in suspension or the water contains large quantities of free carbon dioxid, or other substances, it is often desirable to treat the water to remove these substances and for this purpose I have provided the present installation with an aerating and filtering apparatus. In the arrangement shown, the main structure of the plant is provided in its upper portion, preferably on the roof, with a basin 51 in or above which are supported on framework 52 a plurality of trays 53 to which the water is delivered through a pipe 54. If desired, a flow regulator 55 may be interposed in the pipe 54 to maintain a uniform flow of water to the trays. As the water flows from one tray to the other it is oxidized and gases are freed therefrom. If desired, the trays may contain suitable substances for further treating the water. The water then flows from the basin 51 by gravity through pipes 56 and 57 to a pressure filter 58 with which the pipe 20 is in the present instance connected. In order that the filter may be back washed for the purpose of cleaning the same the pipe 20 is provided with a valve 59 and the outlet for the filter is connected by a branch pipe 60 with the pipe 56 and a valve 61 is inserted in the pipe 60. A valve 62 is interposed in the pipe 56 in advance of the pipe 57 and the latter is connected with a drain pipe 63 in which there is a valve 64. Normally the valves 62 and 59 are open and the valves 61 and 64 are closed. When it is desired to back wash the filter the valves 59 and 62 are closed and the valves 61 and 64 opened so that water flows from the basin 51 through the filter in a reverse direction to the drain.

Water may be supplied to the salt reservoir 6 from any suitable source and under any suitable control. I prefer to take the filtered water from the pipe 20 and deliver the same to the salt reservoir, a suitable float valve or other device being provided to control the level of the water in the reservoir. When a valve and float are mounted within the salt reservoir the action of the salt often interferes with the action of the valve and salt crystals accumulating on the float interfere with its proper operation. I have therefore provided an intermediate water supply tank 65 which is connected with the pipe 20 by a small pipe 66 and is connected with the salt tank by a pipe 67. A valve 68 is mounted within the tank 65 to control the flow of water through the pipe 66 and is operated by a float. The valve and float are so arranged that the level of the water in tank 65 will be maintained at substantially the desired normal level of the brine in the salt reservoir 6. Thus the valve and the float are subjected only to the action of fresh water.

The supply of water to the apparatus and the operation of the reconditioning mechanism is automatically controlled in accordance with the amount of soft water used. I have, in the present instance, provided a master switch to control the operation of the supply pump, the brine pump and the reconditioning mechanism and this master switch is controlled primarily by a float in the soft water reservoir. In Fig. 9 of the drawings I have shown the master switch at 69, which is interposed in the main circuit 70 and controls the supply pump circuit 71, the mechanism circuit 72 and the brine pump circuit 73. The switch is moved to its closed position by a solenoid 74 and when the solenoid is deenergized the switch is opened by a spring 75. The solenoid circuit 76 is connected with a suitable source of current, such as the main circuit, and is provided with a switch 77 which is actuated by a float 78 in the soft water reservoir. The arrangement is such that when the water falls to a predetermined level the switch 77 will be closed and the solenoid 74 energized to actuate the switch and close the circuit through the several motors. When the water has been raised to the desired level the switch 77 will be opened to break the circuit through the solenoid 74 and thus permit the switch to open. This float controlled switch is shown diagrammatically and it will be understood that in practice a switch of the snap action type or other suitable kind will be employed which will permit of a relatively great movement of the float before the switch is actuated. It is not desirable to interrupt the operation of the mechanism during the reconditioning period and I have therefore provided the circuit 76 with a shunt circuit 79 connected across the terminals of the switch 77. This shunt circuit is provided with a switch of such a character and so controlled that it will be retained in its closed position throughout the reconditioning period and will prevent the solenoid from being deenergized in the event the float switch is opened during the reconditioning period. The switch may be of any suitable character and is illustrated as a disk 80 so connected with the mechanism which drives the shaft 30 that it will rotate at the same speed at which that shaft rotates. The disk is provided with contact surfaces 81 so arranged that one of those surfaces will engage a stationary contact 82 approximately at the same time that the brine nozzle 29 moves into communication with one of the brine receptacles 25, and will remain in engagement with the fixed contact 82 until the drain trough 42 moves out of line with the discharge opening 13 of the container. It is also desirable that the brine pump should operate only at such times as the nozzle 29 is in line with one of the brine receptacles 25. Otherwise brine would be pumped continuously into the main receptacle 23 and during the water softening period would merely flow back to the brine tank. I have therefore interposed in the circuit 73 of the brine pump motor a switch which is automatically actuated to close that circuit at or just before the time that the brine nozzle passes into communication with one of the brine receptacles and to break that circuit just as the nozzle passes out of communication with the brine receptacle. This switch is also shown diagrammatically as comprising a disk 83 connected with a part of the mechanism which drives the shaft 30 so that it will rotate at the same speed as that shaft. It is provided with two contact surfaces 84 so arranged that one or the other of them will be moved into engagement with the stationary contact 85 just as the brine nozzle 29 moves into line with one of the brine receptacles 25 and will move out of engagement with the stationary contact at approximately the same time that the brine nozzles moves out of line with the brine receptacle. I have here shown the reconditioning mechanism as operated by an electric motor but it will be obvious that a water motor could be used for this purpose and driven by the water from the main supply pump. Consequently the control of the pump would also control the mechanism motor and no additional controlling device would be necessary.

The brine distributing mechanism above described has the very important advantage of being free from valves which might be corroded or otherwise interfered with by the brine so that they would not properly close. It may in some installations, however, be preferable to use a simpler construction in which the flow of brine would be controlled by automatically operated valves. In Fig. 8 I have shown such a construction. As there illustrated, the brine supply pipe 37 discharges into a brine receptacle 86 with which there is associated a float actuated switch 87 to interrupt the circuit for the brine pump motor when the brine in the receptacle 86 reaches a predetermined level. The distributing pipe 88 leads from the lower portion of the receptacle 86 to the brine pipes 22a which extend into the respective water supply reservoirs 16. In the arrangement here shown branch pipes 89 from the distributing pipe 88 are arranged to discharge into cups or flared upper ends 90 of the pipes 22a, the ends of the pipes 89 being spaced above the cups so that the flow of brine will be visible. Mounted in each pipe 89 is an electrically operated valve 91, the magnets of which are controlled by a switch connected with the mechanism which actuates the shaft 30 and drain trough 42, which will still be retained with this type of brine distributor. This switch may be of any suitable character such as that shown in Fig. 9 for the control of the brine pump. Such a switch will cause the brine valves 91 to be opened and closed at predetermined intervals controlled by the amount of water used. While these valves are subject to leakage because of corrosion or the accumulation of salt crystals thereon this is not important in very large installations where an attendant is constantly present, because the attendant will quickly discover any leakage and properly adjust the valves.

In Fig. 10 I have illustrated another installation in which the mineral container is shown at 95 and hard water is supplied thereto through a supply pipe 96. In the present instance, the hard water supply is electrically controlled, the water being delivered to the pipe 96 by a pump 97 driven by an electric motor 98. An injector 99 is interposed in the supply pipe 96 and brine is delivered to the injector through a pipe 100 from a brine reservoir 101. The delivery of brine is controlled by an electrically operated valve 102 interposed in the pipe 100. A discharge pipe 103 leads from the container 95 and has two branches 104 and 105. The branch 104 leads to the point of discharge for the soft water and, in the present instance, discharges into a storage reservoir or tank 106, which may be of any suitable size and may be arranged in any suitable location with relation to the softening unit. The second branch 105 of the discharge pipe is the drain pipe and is controlled by an electrically operated valve 107. The electrically operated valves 102 and 107 are controlled, respectively, by switches 108 and 109 and the operation of these switches is controlled by an electric motor 110. In the present instance, the motor 110 is connected by gears 111 with a shaft 112 which carries cams 113 and 114 arranged to actuate, respectively, the switches 108 and 109. These cams are so arranged that the two switches will be closed at approximately the same time to open the brine valve 102 and the drain valve 107. After an interval sufficient for the regeneration of the mineral the switch 108 is opened and the valve 102 closed and after a further interval sufficient to wash out the container the switch 109 is opened and the valve 107 closed, thus restoring the softening operation. The electrically operated means for actuating the valve switches is so controlled with relation to the means for supplying hard water to the container that the shaft 112 will rotate continuously while hard water is being supplied to the container and consequently the switches will be controlled in accordance with the quantity of water delivered to the container. In the present instance, the pump motor 98 and the switch controlling motor 110 are connected in the same circuit 115 and this circuit is controlled by a master switch. Preferably the master switch is automatically operated and it is shown at 116 as connected with a float 117 in the storage reservoir 106, the arrangement being such that when the water in the storage reservoir falls to a predetermined level the switch will be closed and the pump and reconditioning mechanism will be started in operation. When the water in the reservoir rises to a predetermined height the switch will be opened and the pump and reconditioning mechanism stopped.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In an apparatus of the character described, a container for water softening material having an outlet above the level of said material, a receptacle arranged alongside of said container, a partition dividing said receptacle into a delivery reservoir and a supply reservoir and having an opening to connect said reservoirs one with the other above the level of the outlet for said container, means for supplying water to said delivery reservoir, and means for so connecting said supply reservoir with said container that the water will be maintained normally at substantially the same level in said supply reservoir and said container.

2. In an apparatus of the character described, a plurality of containers for water softening material each having an outlet above the level of the material therein, a supply reservoir for each container, means for so connecting each container with its supply reservoir that the water will be maintained normally at substantially the same level in said container and said supply reservoir, a single delivery reservoir having communication with each supply reservoir, and means for supplying water to said delivery reservoir.

3. In an apparatus of the character described, a plurality of containers for water softening material each having an outlet above the level of the material therein, a supply reservoir for each container, means for so connecting each container with its supply reservoir that the water will be maintained normally at substantially the same level in said container and said supply reservoir, a single delivery reservoir having communication with each supply reservoir at a point above the normal level of the water in that supply reservoir, and means for supplying water to said delivery reservoir.

4. In a water softening unit comprising two containers for water softening material spaced laterally one from the other and each having an outlet above the level of the material therein, supply reservoirs arranged between said containers, conduits leading from the lower ends of said supply reservoirs to the lower ends of the respective containers, a delivery reservoir arranged between said supply reservoirs and having open communication with each supply reservoir above the outlet for the container with which that supply reservoir is connected, and means for supplying water to said delivery reservoir.

5. In an apparatus of the character described, a container for water softening material having an outlet above the level of said material, a hard water supply reservoir, means for connecting the lower portion of said supply reservoir with the lower portion of said container, means for delivering water to said supply reservoir, means for delivering brine into the lower portion of said supply reservoir adjacent said connecting means.

6. In an apparatus of the character described, a container for water softening material having an outlet above the level of said material, a hard water supply reservoir having an outlet at the lower end thereof, a conduit leading from said outlet to the lower portion of said container, means for supplying water to said reservoir, a brine pipe extending into said reservoir and having its discharge end adjacent to the outlet for said reservoir, and means to control the flow of brine through said brine pipe.

7. In a water softening apparatus comprising a container for water softening material, and means for supplying water to be softened to said container, a brine receptacle, means for connecting said brine receptacle with said container, a brine delivery device mounted for movement into and out of a position to deliver brine to said brine receptacle, means to actuate said device, and means controlled according to the position of said device to supply brine thereto when said device is in a position to deliver brine to said receptacle and to interrupt said supply when said device is moved out of its delivery position.

8. In a water softening apparatus comprising a container for water softening material and means for supplying water to be softened to said container, a brine receptacle having its upper end open, means for connecting said brine receptacle with said container, a brine delivery nozzle rotatably mounted for movement into and out of line with the open end of said brine receptacle, and means to rotate said nozzle.

9. In a water softening apparatus, comprising a container for water softening material and means for supplying water to be softened to said container, a brine receptacle having its upper end open, means for connecting said brine receptacle with said container, a brine delivery nozzle rotatably mounted for movement into and out of line with the open end of said brine receptacle, means to rotate said nozzle, and means controlled according to the position of said nozzle to supply brine thereto when it is in line with the open end of said brine receptacle and to interrupt said supply when said nozzle is out of line with said open end of said receptacle.

10. In a water softening apparatus comprising a container for water softening material, and means for supplying water to be softened to said container, a structure having two receptacles, one of which is relatively small, the other relatively large, a brine delivery nozzle rotatably mounted above said structure for movement into line with said receptacles successively, means for connecting the smaller receptacle with said container, a return conduit leading from the larger receptacle, and means for rotating said nozzle.

11. In a water softening apparatus comprising a container for water softening material, and means for supplying water to be softened to said container, a brine receptacle, means for connecting said brine receptacle with said container, a brine delivery device rotatably supported above said receptacle and comprising a nozzle having a relatively narrow radial discharge opening, the side walls of said receptacle being arranged substantially radially to the axis of said delivery device, and means for actuating said delivery device to cause said nozzle to move into and out of a position to discharge into said receptacle.

12. In a water softening apparatus comprising a container for water softening material having an outlet, and means for supplying water to be softened to said container, a brine receptacle having means for connecting the same with said container, a brine delivery device mounted for rotation into and out of a position to deliver brine to said brine receptacle, a drain trough mounted for rotation into and out of a position to receive fluid from the outlet for said container, said outlet comprising a relatively narrow slot and the side walls of said drain trough being arranged to extend substantially parallel with said slot when passing the same, and means to rotate said brine delivery device and said drain trough in unison.

13. In a water softening apparatus comprising a container for water softening material having an outlet, means for supplying water to be softened to said container, and means for delivering brine to said container, a drain trough mounted for rotation into and out of a position to receive fluid from the outlet for said container, said outlet comprising a relatively narrow slot and the side walls of said drain trough being arranged to extend substantially parallel with said slot when passing the same and having their upper edges sloping inwardly, and means to rotate said drain trough.

14. In a water softening apparatus comprising a container for water softening material having an outlet, and means for supplying water to be softened to said container, a brine reservoir, means for delivering brine from said reservoir to said container, a tank connected with a source of supply for fresh water and with said brine reservoir, a valve to control the flow of water thereto, and a float in said tank to actuate said valve, said valve and said float being arranged to maintain the level of the water in said tank at approximately the normal level of the brine in said reservoir.

15. In a water softening apparatus, a container for water softening material having an outlet, means to supply hard water to said container, a brine reservoir, means for delivering brine from said reservoir to said container, a tank connected with said brine reservoir, a pipe of relatively small capacity connecting said hard water supply with said tank, a valve in said pipe, and a float in said tank to actuate said valve, said valve and said float being arranged to maintain the water in said tank at approximately the normal level of the brine in said reservoir.

16. In a water softening apparatus, a container for water softening material, means to supply hard water to said container, electrical means for operating said hard water supply means, valveless reconditioning mechanism, a motor to operate said reconditioning mechanism, and a master switch to control the operation of said electrical means and said motor.

17. In a water softening apparatus, a container for water softening material, means to supply hard water to said container, electrical means for operating said hard water supply means, valveless reconditioning mechanism, a motor to operate said reconditioning mechanism, and means to supply brine to said reconditioning mechanism, and a master switch to control the operation of said electrical means, said brine supply means and said motor.

18. In a water softening apparatus, a container for water softening material, means to supply hard water to said container, electrical means for operating said hard water supply means, valveless reconditioning mechanism, a motor to operate said reconditioning mechanism, means to supply brine to said reconditioning mechanism, a master switch to control the operation of said hard water supply means, said brine supply means and said motor, and means for interrupting the brine supply during a portion of the time that said reconditioning means is in operation.

19. In a water softening apparatus, a container for water softening material, means to supply hard water to said container, electrical means for operating said hard water supply means, a brine reservoir, a brine receptacle, means to deliver brine from said reservoir to said receptacle, electrical means for operating said brine delivery means, means to supply brine from said receptacle to said container, electrical means for operating said brine supply means, and a master switch to control the several electrically operated means.

20. In a water softening apparatus, a container for water softening material, means for supplying hard water to said container, electrical means for operating said hard water supply means, a brine pipe to supply brine to said container, a drain pipe leading from said container, valves interposed respectively in said brine pipe and said drain pipe, electrical means for operating said valves, switches to control the respective electrical means, means to actuate said switches, electrical means for operating said actuating means and a float-operated master switch to control the electrical means for operating the hard water supply means and the switch actuating means.

21. In a water softening apparatus, a container for water softening material, means for supplying hard water to said container, electrical means for operating said hard water supply means, a brine pipe to supply brine to said container, a drain pipe leading from said container, valves interposed respectively in said brine pipe and said drain pipe, electrical means for operating said valves, switches to control the respective valves, electrically controlled means to actuate said switches, a reservoir to receive softened water from said container, a switch connected in circuit with said hard water supply controlling means and said switch actuating means, and means controlled by the level of the water in said reservoir to actuate the last mentioned switch.

22. In a water softening apparatus, a container for water softening material having an outlet, a reservoir to receive softened water from said outlet, a pump to supply water to be softened to said container, an electric motor for operating said pump, reconditioning mechanism, an electric motor to operate said reconditioning mechanism, a pump to supply brine to said reconditioning mechanism, an electric motor to operate said brine pump, a switch to control the operation of said motors, and a float in said reservoir to control the switch.

23. In a water softening apparatus, a container for water softening material having an outlet, a reservoir to receive softened water from said outlet, a pump to supply water to be softened to said container, an electric motor for operating said pump, reconditioning mechanism, an electric motor to operate said reconditioning mechanism, a pump to supply brine to said reconditioning mechanism, an electric motor to operate said brine pump, a master switch to control said motors, a magnet to actuate said switch, a switch to control said magnet, and a float in said reservoir to control the last mentioned switch.

24. In a water softening apparatus, a container for water softening material having an outlet, a reservoir to receive softened water from said outlet, a pump to supply water to be softened to said container, an electric motor for operating said pump, reconditioning mechanism, an electric motor to operate said reconditioning mechanism, a pump to supply brine to said reconditioning mechanism, an electric motor to operate said brine pump, a master switch to control said motors, a magnet to actuate said switch, a circuit for said magnet, a switch in said magnet circuit, a float in said reservoir to control said magnet switch, and a switch connected across the terminals of said magnet switch and so connected with said reconditioning mechanism that it will close the magnet circuit independently of said magnet switch so long as the reconditioning mechanism is in operation.

25. In a water softening apparatus, a container for water softening material having an outlet, a reservoir to receive softened water from said outlet, a pump to supply water to be softened to said container, an electric motor for operating said pump, reconditioning mechanism, an electric motor to operate said reconditioning mechanism, a pump to supply brine to said reconditioning mechanism, an electric motor to operate said brine pump, a master switch to control said motors, a magnet to actuate said switch, a switch to control said magnet, a float in said reservoir to control the last mentioned switch, and a switch in circuit with the motor for said brine pump and so connected with said reconditioning mechanism that it will be closed during a portion only of the time said mechanism is in operation.

26. In a water softening apparatus, a container for water softening material having an outlet, a reservoir to receive softened water from said outlet, apparatus for supplying hard water, electrical means for operating said apparatus, apparatus for supplying regenerating solution to said container, electrical means for operating said apparatus, a switch to control the electrical means, a magnet to actuate said switch, a switch to control said magnet and a float in said reservoir to control the last mentioned switch.

27. In a water softening apparatus, a container for water softening material having an outlet, a reservoir to receive softened water from said outlet, means for supplying water to be softened to said container, electrical means for operating said means, means for reconditioning the water softening material, electrical means for operating said reconditioning means, a master switch to control both electrical means, a magnet to actuate said switch, a switch to control said magnet, a float in said reservoir to control the last mentioned switch, and means controlled by said reconditioning means to prevent said magnet from being deenergized while said reconditioning mechanism is in operation.

28. In a water softening apparatus, a container for water softening material having an outlet, a reservoir to receive softened water from said outlet, a pump to supply raw water to said container, an electric motor for operating said pump, reconditioning means, an electric motor to control said reconditioning means, an electric circuit connecting said motors to a source of electric energy, a switch in said circuit to control the operation of said motors, and a float in said reservoir to control the switch.

29. A water softening apparatus adapted to perform the operations of softening and regenerating with a continuous supply of hard water and to furnish softened water continuously and uninterruptedly, said apparatus comprising one or more zeolite containers, a source of brine, a reservoir for softened water, an inlet for hard water and an outlet on each container, regenerating mechanism comprising means adapted to divert water from each outlet to waste, electrical means for operating said diverting means, means adapted to feed brine into the inlet, electrical means for operating said brine feed means, electrical control means for both said means, an electric circuit connecting said electrical control means to a source of electrical energy, float switch means in said circuit adapted to be closed when the water in the softened water reservoir is below a predetermined level and adapted to be opened when the level is reached, said electrical control means being adapted to allow softening to take place for a definite interval, then to actuate the diverting means and the brine feed means substantially simultaneously whereby brine is carried into and through a container by the hard water, and spent brine issuing from an outlet is diverted to waste, said control means being further adapted to disconnect the brine feed means after a definite time and to leave the diverting means in action for a further predetermined time for washing, and then to disconnect the diverting means so as to allow hard water to pass through the softener into the reservoir, said control means allowing cycles of brining, washing and softening to take place continuously until the water in the reservoir has been raised to the predetermined level.

30. In an electrically controlled water softening apparatus a container for water softening material having an outlet, a reservoir to receive softened water from the outlet, a pump to supply raw water to said container, electrically controlled power means for operating the pump, reconditioning means for the softener, electrically operable means for controlling the reconditioning means, electrical circuits for said means and for the said electrically controlled power means, means responsive to the level of water in the reservoir and electrical switch means adapted to be actuated by the level-responsive means and to control the circuits for the pump power means and the control means for the reconditioning means.

EDWARD T. TURNER.